April 25, 1950        H. N. EDWARDS        2,505,664
COLOSTOMY RING
Filed March 12, 1948
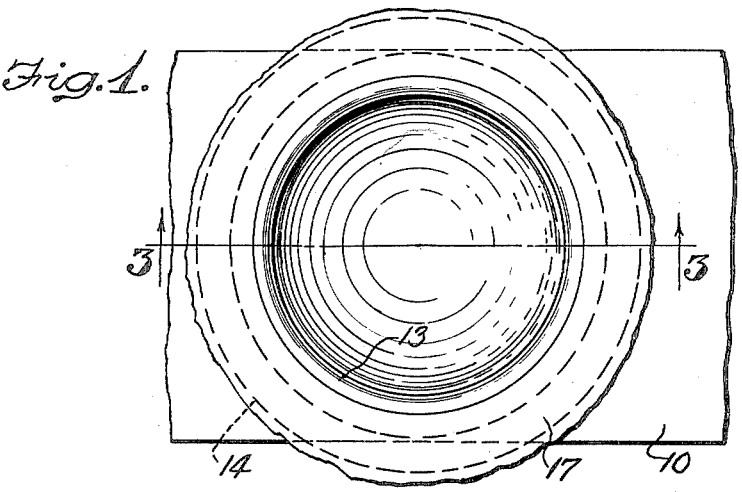
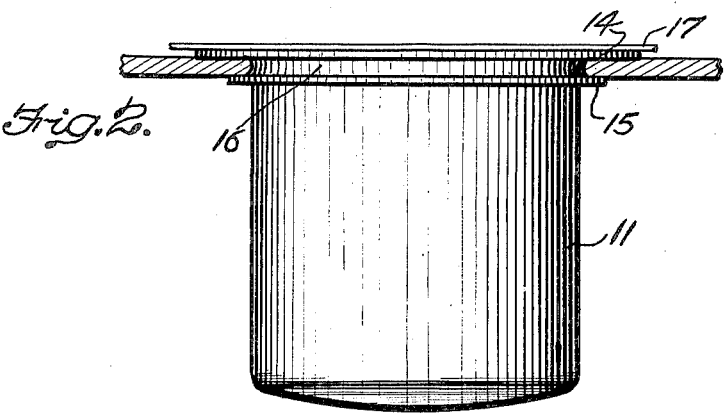
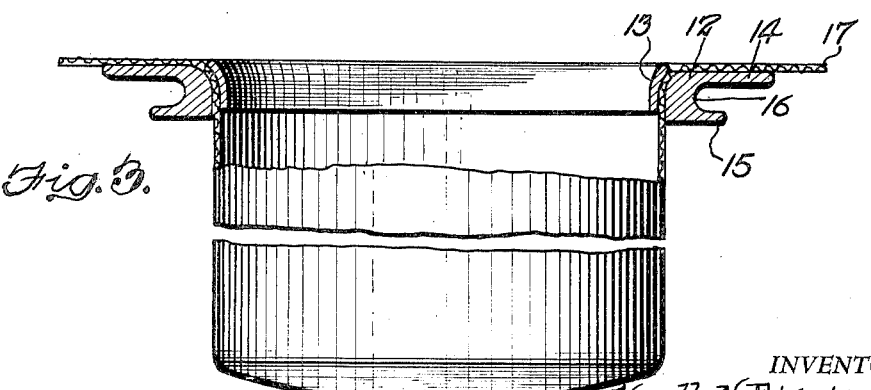
INVENTOR.
Harrell N. Edwards
BY Victor J. Evans & Co.
ATTORNEYS Patented Apr. 25, 1950

2,505,664

UNITED STATES PATENT OFFICE 2,505,664

COLOSTOMY RING

Harrell N. Edwards, Wichita, Kans.

Application March 12, 1948, Serial No. 14,530

1 Claim. (Cl. 128—283)

This invention relates to colostomy ring.

It is an object of the present invention to provide a colostomy ring adapted to be connected to a belt which is worn about the patient who is obliged to expel feces through an abdominal opening which can be easily and readily removed from the belt or other support for the purpose of being cleaned or replaced and with a minimum of effort and time.

Other objects of the present invention are to provide a colostomy ring for belts or other supports, which is of simple construction, inexpensive to manufacture, easy to assemble and disassemble from the belt or support, and efficient in operation.

For other objects and for a better understanding of the invention, reference may be had to the following detailed description taken in connection with the accompanying drawing, in which Fig. 1 is a top plan view looking into the pouch having the ring of the present invention.

Fig. 2 is a side elevational view of the pouch as assembled on a belt or other support.

Fig. 3 is a transverse sectional view taken on line 3—3 of Fig. 1.

Referring now to the figures, 10 represents a belt or abdominal support in which a pouch 11 is fitted and which catches and holds feces extruded from an abdominal opening made by a surgeon when a person's condition makes it necessary for the rectum to be removed or closed. The pouch 11 is made of soft material and its open end is confined between a ring 12 and an inner ring 13. The ring 12 is provided with a large flange 14 and a small flange 15 spaced from the same to provide a groove 16 by which the ring 12 can be attached to an opening in belt 10. The large flange 14 supports the pouch material of a large area about the abdominal opening so as to provide for a good engagement of the pouch with the body surface and thereby to prevent leakage. A flange is accordingly provided of the pouch material as indicated at 17.

The inner ring 13 is of curved section and adapted to have gripping engagement with a corresponding curved face of the ring 12. When the ring 13 is fitted within the ring 12, the pouch material is securely gripped. When it is desired to remove the pouch and the rings for cleaning purposes, the inner ring 13 is forced outwardly of its gripping engagement with the pouch material and with the ring 12. The ring 12, if desired, can also be removed from the belt 10.

The ring elements are preferably made of stainless steel or similar metal. The rings can be made of any size to fit any size colostomy. The rings can be fitted into a belt or any other form of support.

While various changes may be made in the detail construction, it shall be understood that such changes shall be within the spirit and scope of the present invention as defined by the appended claim.

I claim:

A colostomy ring comprising an external ring element made of a rigid material having a top flange adapted to be connected to a belt or the like support, an inner ring adapted to have tight fitting engagement with the outer ring element, and a pouch having an opening portion adapted to be flared and extended over the flange to have large area engagement about the abdominal opening, and said outer ring element having a rounded surface over which the pouch material may be extended, said inner ring having a curved section corresponding to the rounded surface of the outer ring element whereby to bend outwardly and evenly the pouch material upon being extended over the flange, and said outer ring element having a flange at its bottom part whereby to provide a groove between flanges adapted for the connection of the outer ring element with the belt opening.

HARRELL N. EDWARDS.

REFERENCES CITED

The following references are of record in the file of this patent:

UNITED STATES PATENTS

| Number | Name | Date |
|---|---|---|
| 2,341,984 | Graves | Feb. 15, 1944 |

FOREIGN PATENTS

| Number | Country | Date |
|---|---|---|
| 27,254 of 1909 | Great Britain | Nov. 17, 1910 |
| 215,015 | Germany | Oct. 21, 1909 |
| 375,180 | Germany | May 7, 1923 |